No. 802,308. PATENTED OCT. 17, 1905.
L. OLSON.
ICE SHAVER.
APPLICATION FILED SEPT. 17, 1904.
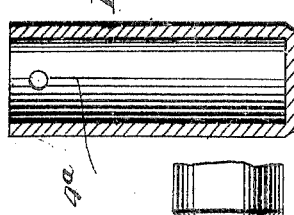
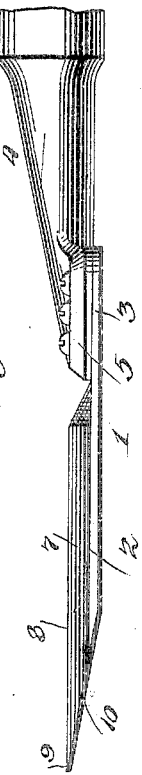
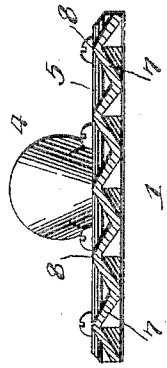
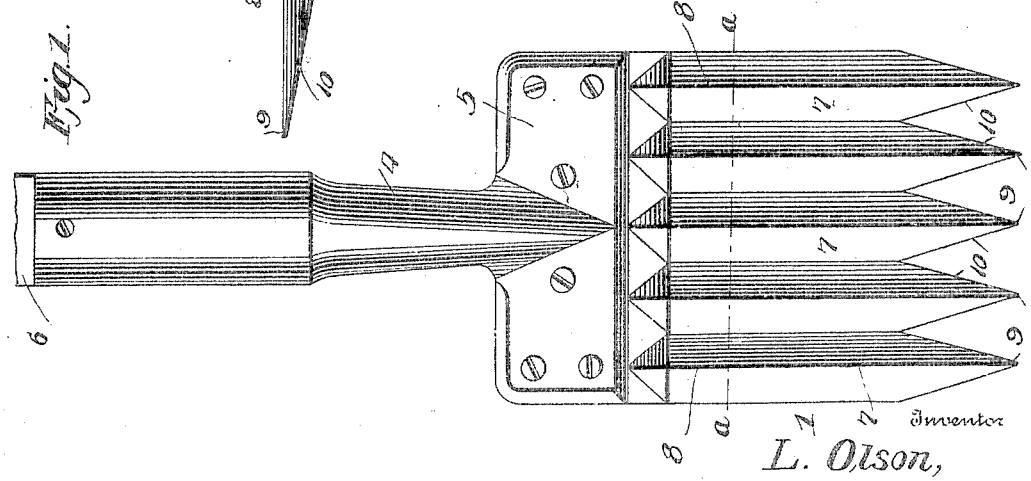
Inventor
L. Olson,
By Victor J. Evans
Attorney
Witnesses

UNITED STATES PATENT OFFICE.

LOUIS OLSON, OF MINNEAPOLIS, MINNESOTA.

ICE-SHAVER.

No. 802,308. Specification of Letters Patent. Patented Oct. 17, 1905.

Application filed September 17, 1904. Serial No. 224,834.

*To all whom it may concern:*

Be it known that I, LOUIS OLSON, a citizen of the United States, residing at 234 Heun avenue, Minneapolis, in the county of Hennepin and State of Minnesota, have invented new and useful Improvements in Ice-Shavers, of which the following is a specification.

This invention pertains to an implement for shaving ice; and it consists of a certain novel construction and arrangement of parts hereinafter described, and particularly pointed out in the claims and illustrated by the accompanying drawings, in which—

Figure 1 is a top view of the improved ice-scraper. Fig. 2 is a bottom plan view of the same. Fig. 3 is a side or edge view of the scraper. Fig. 4 is a cross-section on the line *a a* of Fig. 1.

Similar numerals of reference indicate the same parts on the several figures.

The numeral 1 indicates the shaving-blade as a whole, having a corrugated portion 2 and a flat portion 3 at its rear end. Screwed or otherwise secured to the flat portion 3 of the blade is a shank 4, socketed at $4^a$ to receive a handle 6, preferably of wood. The lower end of the shank 4 is spread, as at 5, and covers the flattened portion 3 of the blade to strengthen the latter and receive the fastening device. The portion 2 of the blade is corrugated or made with longitudinally-disposed angular ribs 7, as shown in Fig. 4; the construction being such that the sides of each rib incline upwardly to form an edge 8, which extends from the shank 4 to the lower end of the blade 1. The lower end of the blade 1 is provided with points 9, having V-shaped cutting edges 10, formed by the angular sides of the rib 7.

The blade 1 is made from a flat sheet of steel, the ribs or corrugations being formed by pressing them up in a well-known manner. The points 9 are made by either indenting one end of the sheet of steel before it is pressed in such shape as to produce the points 9 or by leaving the plate straight and cutting or grinding the end of the blade at an angle, as shown by Fig. 3. By forming the scraping-points in the manner shown their under surfaces are flattened, as at 11, Fig. 2, which permits the points to be easily and quickly ground to produce sharp cutting edges 10.

Having thus described the invention, what is claimed as new, and desired to be secured by Letters Patent, is—

A hand ice-scraper comprising a cutter-plate flat at one end and corrugated from said flat portion to its other end, the inner ends of the corrugations forming shoulders and each corrugation consisting of an angular rib having sides which meet centrally to form an edge, the sides being cut away to form points at their outer ends, the under sides of said points being grooved flat on a bevel to the tips of the points, whereby all the points may be simultaneously sharpened, a handle having an attaching-plate seated on the flat portion of the cutter-plate with its forward edge abutting against said shoulders, the said forward edge of the attaching-plate being beveled to form an unobstructed surface for free clearance of the shaved ice, and fastenings connecting the plates, substantially as described.

In testimony whereof I affix my signature in presence of two witnesses.

LOUIS OLSON.

Witnesses:
 JOHN F. BEMBOGEN,
 JOHN VALENTINE.